United States Patent

Ghidini

[11] Patent Number: 5,580,169
[45] Date of Patent: Dec. 3, 1996

[54] MILK JUG WITH FROTH-FORMING DEVICE FOR MAKING "CAPPUCCINO" AND THE LIKE

[75] Inventor: Tiziano Ghidini, Lumezzane, Italy

[73] Assignee: Frabosk Casalinghi S.p.A., Lumezzane, Italy

[21] Appl. No.: 553,225

[22] Filed: Nov. 7, 1995

[30] Foreign Application Priority Data

Nov. 22, 1994 [IT] Italy ............................... MI94U0771

[51] Int. Cl.⁶ ........................................................ B01F 11/00
[52] U.S. Cl. ............................................ 366/256; 366/333
[58] Field of Search ........................... 366/130, 255–260, 366/315–317, 332, 333

[56] References Cited

U.S. PATENT DOCUMENTS

| | | | |
|---|---|---|---|
| 548,712 | 10/1895 | Laney | 366/333 X |
| 1,637,103 | 7/1927 | Corwin | 366/130 |
| 1,998,692 | 4/1935 | Van Rossem et al. | 366/333 |
| 2,291,708 | 8/1942 | Gluck | 366/260 |
| 2,481,352 | 9/1949 | Sabatella | 366/260 |
| 2,726,071 | 12/1955 | Bernhardt | 366/256 |
| 3,137,228 | 6/1964 | Elow | 366/332 X |
| 3,546,129 | 12/1970 | Berg et al. | 366/332 X |
| 4,010,934 | 3/1977 | McCord et al. | 366/316 X |
| 4,676,655 | 6/1987 | Handler | 366/332 X |
| 4,737,036 | 4/1988 | Offermann | 366/130 |
| 4,946,286 | 8/1990 | Purkapile | 366/316 X |
| 5,284,389 | 2/1994 | Lumsden | 366/256 |

FOREIGN PATENT DOCUMENTS

| | | |
|---|---|---|
| 384589 | 12/1931 | Belgium . |
| 0167423 | 1/1986 | European Pat. Off. . |
| 642130 | 8/1928 | France ................................. 366/256 |
| 965122 | 9/1950 | France . |
| 1055182 | 2/1954 | France . |
| 333081 | 2/1921 | Germany . |
| 165229 | 6/1921 | United Kingdom .................. 366/256 |
| 237660 | 8/1925 | United Kingdom .................. 366/256 |
| 363543 | 12/1931 | United Kingdom . |
| 395548 | 7/1933 | United Kingdom . |

*Primary Examiner*—Charles E. Cooley
*Attorney, Agent, or Firm*—Guido Modiano; Albert Josif

[57] ABSTRACT

A milk jug with froth-forming device for making cappuccino and the like, including a container body that can be closed with a lid that supports and guides a froth-forming element, which is constituted by a plunger element associated with a rod that protrudes from the lid. The plunger element has a disk-like element formed by a circumferential rim that is connected, by spoke-like arms, to a central hub in which the rod is inserted. The spoke-like arms retain a mesh affecting the entire surface of the disk-like element, and the spoke-like arms decrease in thickness from the hub towards the outer rim to provide flexibility on the outer portion of the disk-like element so as to increase the inclusion of air particles inside the liquid upon a reciprocating motion of the plunger element.

5 Claims, 1 Drawing Sheet

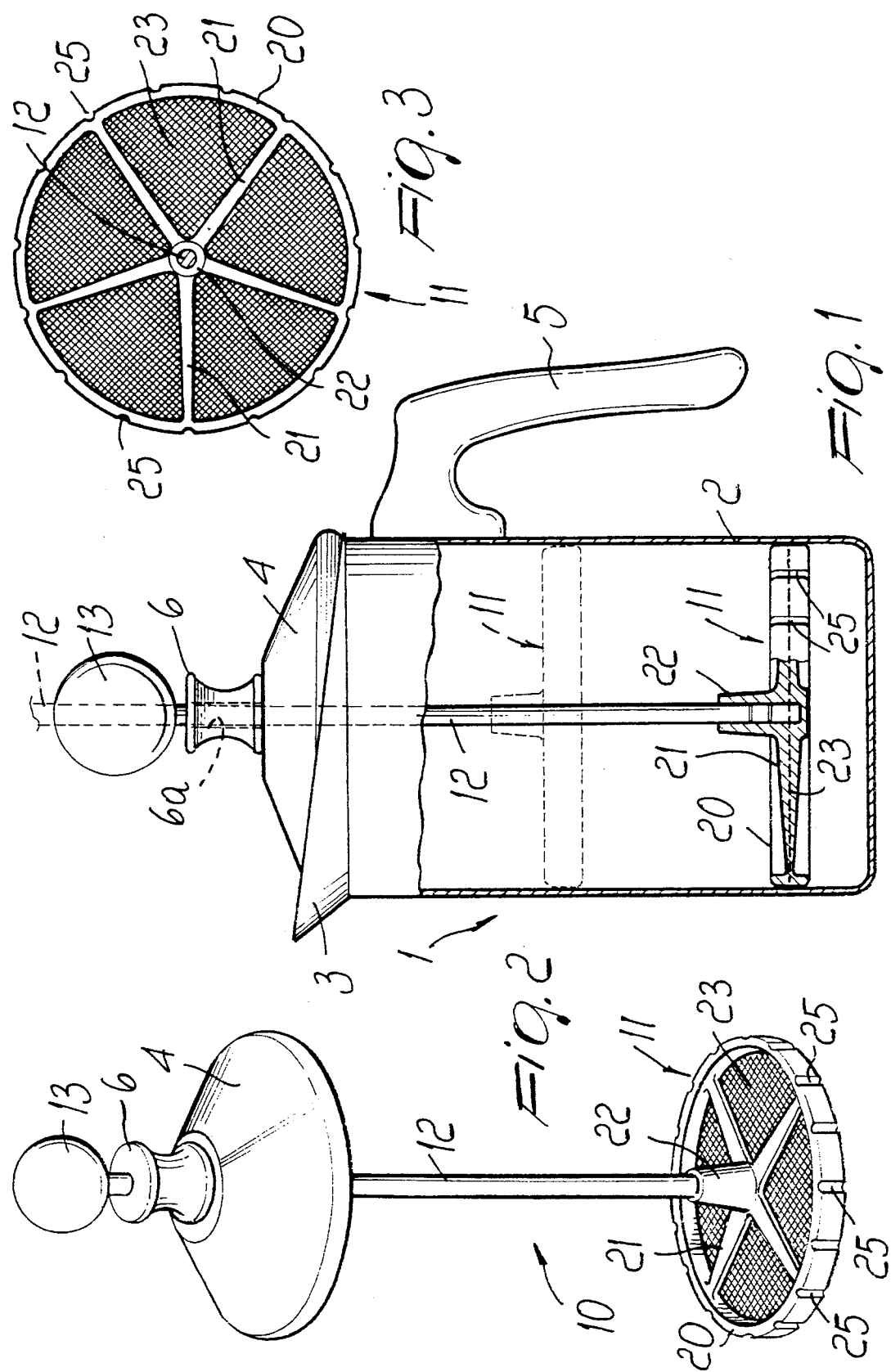

MILK JUG WITH FROTH-FORMING DEVICE FOR MAKING "CAPPUCCINO" AND THE LIKE

BACKGROUND OF THE INVENTION

The present invention relates to a milk jug with a forth-forming device for making "cappuccino" and the like.

It is known that a steam jet having the purpose of emulsifying the milk is currently used to make beverages such as cappuccino and the like.

Of course, this type of application is usable only if a machine capable of generating the desired jet of steam is available.

Therefore, it is practically impossible to make a cappuccino in a household environment, since devices allowing to emulsify the milk in a quick and simplified manner are not currently available.

SUMMARY OF THE INVENTION

A principal aim of the present invention is to solve the above described problem by providing a milk jug with a froth-forming device for making cappuccino and the like that allows to emulsify the milk without having to resort to the use of a jet of steam.

Within the scope of the above aim, a particular object of the invention is to provide a milk jug having a simplified structure and allowing to obtain the froth with very simple actions that can be performed easily by anyone.

Another object of the present invention is to provide a milk jug with a froth-forming device for making cappuccino and the like which is capable of giving the greatest assurances of reliability and safety in use by virtue of its particular constructive characteristics.

Another object of the present invention is to provide a milk jug with a froth-forming device that can be easily produced starting from commonly commercially available elements and materials and is furthermore competitive from a merely economical point of view.

This aim, these objects, and others which will become apparent hereinafter are achieved by a milk jug with froth-forming device for making cappuccino and the like, according to the invention, characterized in that it comprises a container body that can be closed with a lid which supports and guides a froth-forming element, constituted by a plunger element associated with a rod that protrudes from said lid.

BRIEF DESCRIPTION OF THE DRAWINGS

Further characteristics and advantages of the present invention will become apparent from the following detailed description of a milk jug with froth-forming device for making cappuccino and the like, illustrated only by way of non-limitative example in the accompanying drawings, wherein:

FIG. 1 is a partially cutout view of the jug according to the invention;

FIG. 2 is a perspective view of the froth-forming element;

FIG. 3 is a plan view of the plunger element.

DESCRIPTION OF THE PREFERRED EMBODIMENTS

With reference to the above figures, the milk jug with froth-forming device for making cappuccino and the like, according to the invention, is generally designated by the reference numeral 1 and comprises a container body 2 preferably but not necessarily made of stainless steel and having a cylindrical shape. Possibly a beak 3 shaped like an inclined plane that is formed monolithically with the container body 2 may be provided, and furthermore the body 2 can be equipped with a gripping handle or handgrip 5 made of heat insulating material.

A lid 4 can be coupled to the container body and is also preferably made of stainless steel; its size is such that it is associable with the inside of the body 2 by simply pressing.

The lid 4 acts as a supporting and guiding element for a froth-forming element, generally designated by the reference numeral 10, that is advantageously constituted by a plunger element 11 connected to a rod 12 that passes through the lid 4 and ends with a grip knob 13, preferably made of a heat insulating material.

In order to facilitate the actuation, a finger-bearing element 6, made of heat insulating material, is provided on the lid 4 in the passing zone of the rod 12; further to providing a finger rest, the element 6 also forms a through guiding channel 6a for the rod.

The plunger element 11 has a disk-like body formed by a circumferential rim 20 that is connected, by means of spoke-like arms 21, to a central hub 22, in which the rod 12 is inserted.

The spoke-like elements 21 retain a mesh 23 affecting the entire surface of the disk-like element and decrease in thickness from the hub towards the outer rim 20.

The outer rim or ring 20 has a diameter that substantially matches the inside diameter of the container body 2 and is provided, on the outer part, with a plurality of recesses 25 that allow the flow of liquid in addition to the liquid that passes through the mesh 23.

In practical use, by subjecting the plunger element 11 to a reciprocating motion, the liquid is forced to pass through the disk-like body, consequently emulsifying the air inside said liquid and producing the froth or cream.

To pour out the cream obtained, the lid 4 is removed by using the finger-bearing element 6, while the plunger 11 may be used in order to facilitate the outflow of the cream.

With the above described jug it is therefore possible, with extremely simple means and with an action that consists simply of a reciprocating motion of the plunger element, to emulsify the liquid by including air inside it, thus producing the typical froth used to make cappuccino and the like.

From the above description it is thus evident that the invention achieves the intended aim and objects, and in particular the fact is stressed that the particular structure of the disk-like element, which has tapering spokes, allows to provide flexibility on the outer portion of the disk-like body, further increasing the inclusion of air particles inside the liquid.

In practice, the materials employed, so long as they are compatible with the specific use, as well as the contingent shapes and dimensions, may be any according to the requirements.

What is claimed is:

1. A milk jug with a froth-forming device, said device comprising:

a container body for containing a liquid;

a lid for closing said container body; and a froth-forming element guidingly supported by said lid, said froth-forming element including a plunger element slidably positioned inside said container body, said plunger element being connected to a rod, said rod slidingly protruding from said lid;

wherein said plunger element has a disk-like body, said disk-like body comprising an outer ring, said ring being connected, through spoke-like arms, to a central hub connected to said rod;

and wherein said disk-like body has, on a main surface thereof, a mesh, said mesh being supported by said outer ring and said spoke-like arms;

and wherein said spoke-like arms have a cross-section that decreases from said hub towards said outer ring in a tapered manner such that the outer portion of the disk-like body flexes during a reciprocating motion of said plunger element inside said container body in order to increase the inclusion of air particles inside the liquid.

2. Jug according to claim 1, further comprising a finger-bearing element positioned on said lid.

3. Jug according to claim 2, wherein said finger-bearing element is made of a heat insulating material.

4. Jug according to claim 2, wherein said finger-bearing element forms a through channel for guiding said rod.

5. Jug according to claim 1, wherein said outer ring has an external peripheral region in essential sliding contact with the internal surface of said container body, said external peripheral region being provided with recesses for allowing an additional flow of liquid through said recesses during a reciprocating movement of said plunger element.

* * * * *